United States Patent
Cao et al.

(10) Patent No.: US 12,200,054 B2
(45) Date of Patent: Jan. 14, 2025

(54) BLOCKCHAIN SHARDING METHOD, SYSTEM, AND SERVER BASED ON LOCALLY REPAIRABLE SYSTEM CODES

(71) Applicants: University of Electronic Science and Technology of China, Chengdu (CN); Sichuan Digital Economy Research Institute (Yibin), Yibin (CN); Hangzhou Yunphant Network Technology Co. Ltd., Hangzhou (CN)

(72) Inventors: Sheng Cao, Chengdu (CN); Butian Huang, Chengdu (CN); Xiaosong Zhang, Chengdu (CN)

(73) Assignees: University of Electronic Science and Technology of China, Chengdu (CN); Sichuan Digital Economy Research Institute (Yibin), Yibin (CN); Hangzhou Yunphant Network Technology Co. Ltd., Hangzhou (CN)

( * ) Notice: Subject to any disclaimer, the term of this patent is extended or adjusted under 35 U.S.C. 154(b) by 0 days.

(21) Appl. No.: 18/394,594

(22) Filed: Dec. 22, 2023

(65) Prior Publication Data

US 2024/0414228 A1    Dec. 12, 2024

(30) Foreign Application Priority Data

Jun. 6, 2023 (CN) .......................... 202310665982.5

(51) Int. Cl.
*H04L 67/10* (2022.01)
*G06F 16/27* (2019.01)
*H04L 67/1097* (2022.01)

(52) U.S. Cl.
CPC .......... *H04L 67/1097* (2013.01); *G06F 16/27* (2019.01)

(58) Field of Classification Search
None
See application file for complete search history.

(56) References Cited

U.S. PATENT DOCUMENTS 11,856,100 B2 * 12/2023 Kramer ................ H04L 9/3239
2023/0019637 A1 * 1/2023 Sadoghi Hamedani .....................
H04L 9/3247

* cited by examiner

*Primary Examiner* — Kris E Mackes
*Assistant Examiner* — Cao D Vuong
(74) *Attorney, Agent, or Firm* — Kirk A. Wilson; Joseph T. Guy; Patent Filing Specialist Inc.

(57) ABSTRACT

The present disclosure provides a blockchain sharding method, system, and server based on locally repairable system codes. The blockchain sharding system includes k original shards and n–k encoding shards. In each round of consensus, each original shard and m corresponding encoding shards form a local verification group (m<<n–k), and each encoding shard and t original shards participating in generation of the encoding shard form local recovery groups (t<<k). The local verification group is responsible for verifying whether a to-be-verified transaction is legitimate. When a single shard in the verification group is corrupted, the remaining m shards can reach a consistent verification result. According to the principle that the minority is subordinate to the majority, the verification group can still correctly verify the legitimacy of the transaction.

2 Claims, 3 Drawing Sheets

BLOCKCHAIN SHARDING METHOD, SYSTEM, AND SERVER BASED ON LOCALLY REPAIRABLE SYSTEM CODES

CROSS REFERENCE TO RELATED APPLICATION

This patent application claims the benefit and priority of Chinese Patent Application No. 2023106659825, filed with the China National Intellectual Property Administration on Jun. 6, 2023, the disclosure of which is incorporated by reference herein in its entirety as part of the present application.

TECHNICAL FIELD

The present disclosure relates to the technical field of blockchain, and in particular, to a blockchain sharding method, system, and server based on locally repairable system codes.

BACKGROUND

Blockchain is a distributed ledger that enables decentralized message verification and consensus. The data stored on it is immutable, making it a reliable method for protecting digital evidence. In traditional blockchain systems, all nodes verify and store the complete content of same blocks, resulting in limited scalability; challenging throughput improvement, and increased storage overhead on nodes. The blockchain sharding scheme consists of multiple shards that collectively form the blockchain. Different shards achieve consensus on different contents in parallel and independently generate separate blocks. This approach enhances scalability and alleviates storage overhead. However, if a single shard is corrupted, it can jeopardize the overall system's security and availability.

Chinese patent CN112835743A, published on May 25, 2021 and titled "DISTRIBUTED ACCOUNT BOOK DATA STORAGE OPTIMIZATION METHOD AND APPARATUS, ELECTRONIC DEVICE AND MEDIUM", proposes to divide the blockchain system into network shards, and perform encoding and distributed buffering within each consensus unit composed of a plurality of servers, to alleviate the storage overhead. Consensus among the consensus units is achieved through the Practical Byzantine Fault Tolerance (PBFT) algorithm.

Chinese patent CN110175212A, published on Aug. 27, 2019 and titled "BLOCK CHAIN DISTRIBUTED STORAGE METHOD, DATA READING METHOD AND DEVICE AND STORAGE MEDIUM" proposes that when the quantity of blocks reaches a specific threshold, the blocks are segmented into a plurality of data segments. These data segments are then encoded and distributed for storage.

Chinese patent CN113905059A, published on Jan. 7, 2022 and titled "BLOCK STORAGE METHOD AND MODEL OF LIGHTWEIGHT BLOCK CHAIN OF INTERNET OF VEHICLES", proposes that after the block is generated, it is encoded using the LT fountain code, then the encoding blocks are randomly sent to nodes in the network, and a plurality of encoding blocks are stored in a roadside unit (RSU). When a transaction needs to be verified, it is verified by restoring historical blocks.

In the current blockchain scheme that incorporates encoding technology, a transaction is typically verified by only one shard, and each shard can verify information solely within its own stored blocks. Therefore, in these schemes, if a single shard is corrupted, it will become impossible to verify the legitimacy of transactions, leading to system insecurity and unavailability.

SUMMARY

To overcome the shortcomings of the existing technologies, a blockchain sharding method, system, and server based on locally repairable system codes are proposed, to make the whole system secure and available.

To achieve the above invention purpose, the present disclosure discloses a blockchain sharding system based on locally repairable system codes. A codeword of the locally repairable system codes consists of n symbols including k original symbols and n–k check symbols, and each check symbol is generated through linear combination of a plurality of original symbols. Correspondingly, in the system, a plurality of servers used as blockchain nodes are divided into n groups, each group represents one shard, the system includes n shards, the n shards include k original shards and n–k encoding shards, block data stored in each encoding shard is generated through linear combination of block data stored in a plurality of original shards, and all the shards achieve intra-shard consensus through a same Byzantine Fault Tolerance (BFT) algorithm. Further, one of the n shards is selected as a leader shard, the leader node in the leader shard is denoted as LL, and the LL is not only responsible for consensus within the leader shard, but also participates in the consensus process of the whole blockchain sharding system.

In each round of consensus, the LL obtains local verification groups and local recovery groups in the system based on historical block data and historical verifiable random function (VRF) random number sequences. The LL distributes a plurality of to-be-verified transactions to a plurality of corresponding local verification groups, and shards in each verification group complete verification of the transaction based on stored blocks. When a single shard in the system is corrupted, other shards in the verification group to which the shard belongs are capable of completing verification of the to-be-verified transaction, and the system is still secure and available. After intra-shard consensus, each shard returns a consensus result to the LL, and the LL make statistics on the consensus result of each shard, to verify legitimacy of the to-be-verified transaction. The LL divides legitimate transactions into k parts, packages the k parts into k blocks, and distributes the k blocks to the k original shards. Each encoding shard regenerates a new VRF random number in this round of consensus and broadcasts the new VRF random number to all other shards. After receiving the block from the LL, each original shard distributes the received blocks to the associated encoding shards based on the VRF random number sequences generated in this round of consensus.

When a single shard in the system is corrupted, the system can recover content stored in other shards within the local recovery group where the shard is located, and then conduct decoding and calculation to recover the content stored in the corrupted shard.

The present disclosure further provides a blockchain sharding server based on locally repairable system codes. According to the blockchain sharding server based on locally repairable system codes, each server represents a node in a blockchain sharding system, and functional modules of the server node include a VRF random number generation module, a new transaction buffer and distribution module, a transaction information verification module, an intra-shard consensus module, a node identity module, a signature aggregation module, a counting and block generation and distribution module, a encoding module, and a storage module.

The VRF random number generation module is used by each encoding shard to generate a random number at the beginning of each round of consensus, and broadcast the random number to all other shards in the system.

The new transaction buffer and distribution module is used by the LL, after receiving a latest transaction, to determine, based on a stored block of each shard and the historical VRF random number sequence, shards capable of verifying the transaction, so as to buffer the transaction in buffers corresponding to different shards on the LL. When transaction information in buffer is sufficient, the LL sends the transaction information to corresponding shards for verification.

The transaction information verification module is used to determine legitimacy of the transaction based on the transaction information stored in the node.

The intra-shard consensus module is used to reach a consensus on a verification result among nodes in the shard, and the leader node in the shard returns the verification result to the LL.

The node identity module is used for node identity determining and signing, to ensure that all messages sent by the server in the system are signed, and sources of the messages are verified through signatures.

The signature aggregation module is used to aggregate signatures, when the leader node in each shard requires most nodes in the shard to reach a consensus on a same message and send a consensus result to other shards, signatures of a sufficient quantity of nodes in the shard that support the message.

The counting and block generation and distribution module is used to make statistics on transaction verification information returned by each shard and generate k blocks based on a statistical result.

The encoding module is used to generate an encoding block. In each round of consensus, after verifying a plurality of transactions based on historical blocks, the LL divides legitimate transactions into k parts, packages the k parts into k blocks, and sends the k blocks to k original shards. Each encoding shard generates a random number based on the VRF algorithm, and encodes, based on the random number, a block stored in this round of consensus by an original shard participating in generation of the encoding shard, to obtain an encoding block to be stored by the encoding block in this round of consensus.

The storage module is used to store blockchain data to be stored by the shard to which the node belongs.

The storage module is built based on an existing database, and is divided into a blockchain storage module, a transaction information storage module, and a blockchain information storage module, respectively storing blocks or encoding blocks corresponding to the shard, latest unspent transaction outputs (UTXO) state information or account balance information related to the block, and historical information of the VRF algorithm or historical information of other shards. The blocks stored in the transaction information storage module are related to a transaction model adopted by the system.

The present disclosure further provides a blockchain sharding method based on locally repairable system codes. The method includes a VRF random number generation and distribution phase, a transaction allocation phase, an intra-shard consensus phase, an inter-shard voting phase, a block generation phase, a block encoding phase, and a transaction information storage phase, and specifically includes the following steps:

(1) At the beginning of each round of consensus, each encoding shard generates a VRF random number, signatures and broadcasts the VRF random number to all other shards. Any shard is capable of associating the encoding shard with original shards based on random number sequences of all the encoding shards in this round.

(2) The LL collects to-be-verified transaction information, and stores, based on the historical VRF random number sequence, the to-be-verified transaction information in message buffers corresponding to different shards on the LL. When a total amount of to-be-verified transaction information in the buffers reaches the threshold, the to-be-verified transaction information in the corresponding buffer is sent to each shard.

(3) The leader node in each shard leads nodes in the shard to verify the to-be-verified transaction, to reach a consensus on a verification result by using a PBFT consensus algorithm; and the leader node in each shard aggregates signatures of the nodes in the shard on the result, and returns the consensus result and the aggregated signatures to the LL.

(4) The LL makes statistics on the consensus results of the shards, and when a quantity of shards verifying the to-be-verified transaction to be legitimate exceeds a threshold, the system determines the transaction as a legitimate transaction. When no shard in the system is corrupted, any legitimate transaction is verified as legitimate. When a single shard in the system is corrupted, other shards in the verification group are still capable of verifying a legitimate transaction as legitimate, and the system is still secure and available.

(5) After the system accumulates suffice valid transactions, the LL divides the valid transactions into k parts, that is, packages the valid transactions into k blocks, and sends the k blocks to the original shards with corresponding numbers. Each original shard distributes, based on the VRF random number sequences generated in this round, the received blocks to the corresponding encoding shards with the original shard.

(6) Each encoding shard generates, based on the blocks received in this round, an encoding block of the shard in this round of consensus.

(7) The original shard stores the corresponding block and transaction information in the block; the encoding shard stores corresponding UTXO information in the blocks received from the original shard, and stores the encoding block, and then deletes the received blocks.

The transaction received in the step (2) includes four parts: a transaction head, a historical transaction used as a support and a height of a block in which the historical transaction is stored, and other information such as a signature of a transaction user of a newly generated transaction that is used as an output. Based on the historical transaction and information about the height of the block in which the historical transaction is stored, combined with the historical VRF random number sequence, the LL determines an original shard and a plurality of corresponding encoding shards that are capable of verifying the transaction.

The step (6) adopts the locally repairable system codes, and the type of encoding has the following functions:

(1) a block stored in an original shard participates in generation of encoding blocks stored in a plurality of encoding shards, and the original shard and the encoding shards form a verification group; and in this way; when a single shard in the system is corrupted, other shards in the verification group to which the shard belongs are still capable of completing verification of a to-be-verified transaction, and the system is still secure; and (2) a block stored in an encoding shard is formed through linear combination of blocks stored in a plurality of original shards, the original shards participating in encoding and the encoding shard form a locally recovery group: when any shard in the group is corrupted, a block of the corrupted shard is recovered through decoding calculation with blocks stored in other shards in the group. The purpose of the present disclosure is implemented as follows:

With regard to the problem that when a single shard is corrupted, the entire system will suffer insecurity and unavailability in the current blockchain sharding scheme, the present disclosure proposes a blockchain sharding method, system, and server based on locally repairable system codes. The present disclosure combines encoding technology with the blockchain sharding system. This system reduces storage overhead by dividing blocks into different shards. By constructing a local verification group, when a single shard in the verification group is corrupted, the remaining m shards in the group can achieve a consistent verification result. According to the principle of the minority obeying the majority: the verification group can still correctly verify the legitimacy of the transactions. By constructing a locally recovery group, when a single shard in the recovery group is corrupted, the content stored in the corrupted shard can be restored through decoding and calculations based on the blocks stored in other shards in the group.

Therefore, according to the blockchain sharding method, system, and server based on locally repairable system codes of the present disclosure, each original shard is combined with m encoding shards that the shard participates in generating to form several local verification groups. When a shard in the system is corrupted, the remaining m shards in the verification group can achieve a consistent verification result. According to the principle of the minority obeying the majority, the verification group can still verify the legitimacy of the transactions correctly. In this way: the system is still secure and available. Moreover, when a single shard is corrupted, the content stored in the corrupted shard can be restored through decoding and calculations using the local recovery group where the shard is located. In summary: the present disclosure proposes a novel and feasible blockchain sharding scheme based on locally repairable system codes.

DETAILED DESCRIPTION OF THE EMBODIMENTS

Figure 1:
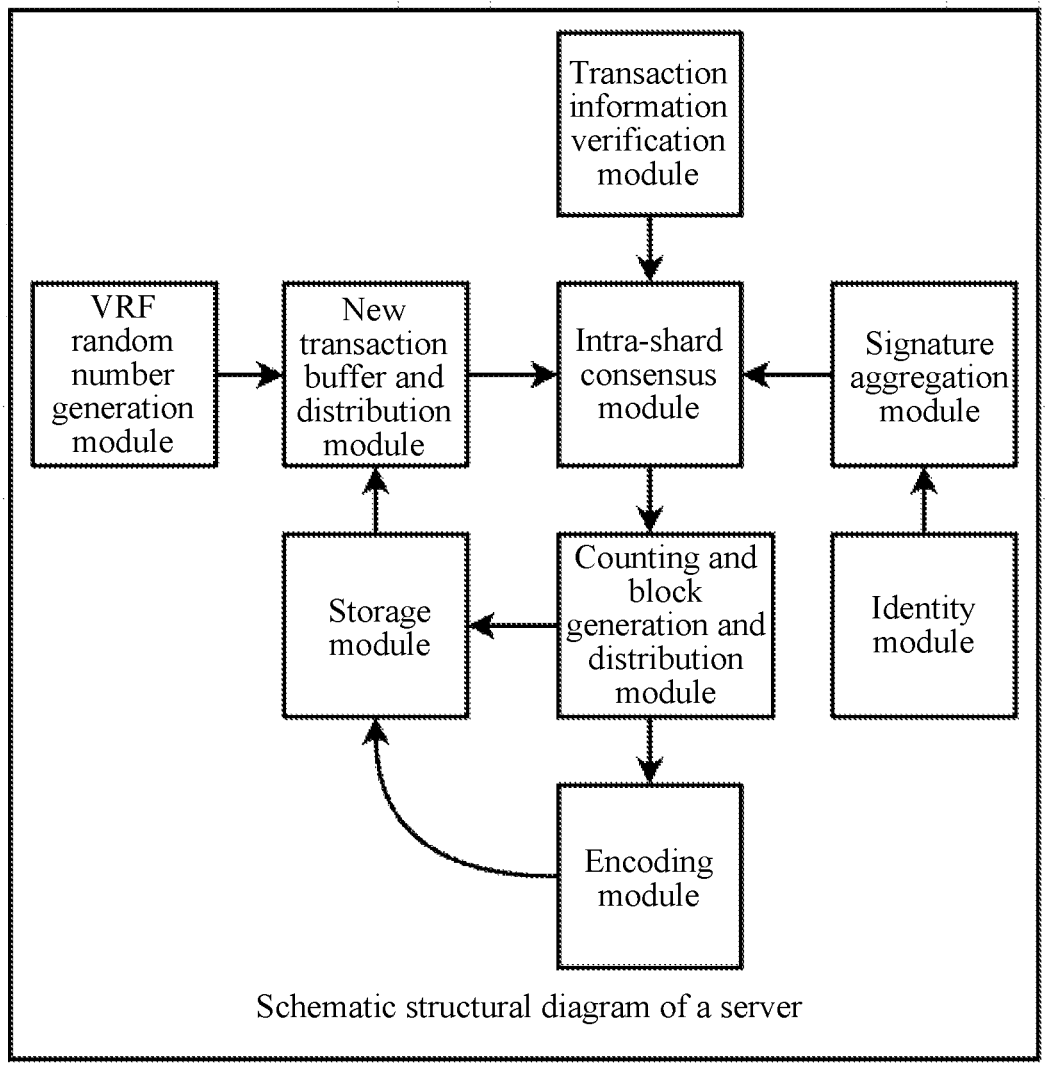
FIG. 1 is a schematic structural diagram of a blockchain sharding node based on locally repairable system codes according to an embodiment of the present disclosure.

The specific implementations of the present disclosure are described below with reference to the accompanying drawings, such that those skilled in the art can better understand the present disclosure. It is important to note that in the following description, when detailed description of known functions and designs may dilute the main content of the present disclosure, details are omitted herein.

In order to combine the advantages of scalability and low node storage overhead of the blockchain sharding technology, and resolve the problem that the current sharding system is insecure and unavailable when a single shard is corrupted, the embodiments of the present disclosure provide a blockchain sharding method, system, and server based on locally repairable system codes, to introduce the encoding technology into the consensus process of the blockchain sharding system. Through the encoding technology, a plurality of shards are associated, such that the system can still ensure the reliability of transaction verification when a single shard is corrupted. The system includes a plurality of servers, and functional modules of each server include a VRF random number generation module, a new transaction buffer and distribution module, a transaction information verification module, an intra-shard consensus module, a node identity module, a signature aggregation module, a counting and block generation and distribution module, a encoding module, and a storage module.

The VRF random number generation module is used by each encoding shard to generate a random number at the beginning of each round of consensus, and broadcast the random number to all other shards in the system.

The new transaction buffer and distribution module is used by the LL, after receiving a latest transaction, to determine, based on a stored block of each shard and the historical VRF random number sequence, shards capable of verifying the transaction, so as to buffer the transaction in buffers corresponding to different shards on the LL. When transaction information in buffer is sufficient, the LL sends the transaction information to corresponding shards for verification.

The transaction information verification module is used to determine legitimacy of the transaction based on the transaction information stored in the node.

The intra-shard consensus module is used to reach a consensus on a verification result among nodes in the shard, and the leader node in the shard returns the verification result to the LL.

The node identity module is used for node identity determining and signing, to ensure that all messages sent by the server in the system are signed, and sources of the messages are verified through signatures.

The signature aggregation module is used to aggregate signatures, when the leader node in each shard requires most nodes in the shard to reach a consensus on a same message and send a consensus result to other shards, signatures of a sufficient quantity of nodes in the shard that support the message.

The counting and block generation and distribution module is used to make statistics on transaction verification information returned by each shard and generate k blocks based on a statistical result.

The encoding module is used to generate an encoding block. In each round of consensus, after verifying a plurality of transactions based on historical blocks, the LL divides legitimate transactions into k parts, packages the k parts into k blocks, and sends the k blocks to k original shards. Each encoding shard generates a random number based on the VRF algorithm, and encodes, based on the random number, a block stored in this round of consensus by an original shard participating in generation of the encoding shard, to obtain an encoding block to be stored by the encoding block in this round of consensus.

The storage module is used to store blockchain data to be stored by the shard to which the node belongs.

For better understanding of the foregoing technical solution, the following describes the foregoing technical solution in detail with reference to the accompanying drawings and specific implementations.

Embodiment 1

This embodiment provides a blockchain sharding method, system, and server based on locally repairable system codes. As shown in FIG. 1, each server represents a node in the blockchain sharding system. Functional modules of the server node include a VRF random number generation module, a new transaction buffer and distribution module, a transaction information verification module, an intra-shard consensus module, a node identity module, a signature aggregation module, a counting and block generation and distribution module, a encoding module, and a storage module.

The VRF random number generation module is used by each encoding shard to generate a random number at the beginning of each round of consensus, and broadcast the random number to all other shards in the system.

The shards need a pair of public and private keys and a seed to generate the VRF random number. In this system, the public and private keys used by a shard to generate the VRF random number is the public and private keys of the leader node in the shard, and the seed used each time is the hash of the blocks stored by the shard. In this way, the system ensures the verifiability, fairness, randomness and tamper resistance of the random number, preventing a malicious node from controlling generation of the random number.

The new transaction buffer and distribution module is used by the LL, after receiving a latest transaction, to determine, based on a stored block of each shard and the historical VRF random number sequence, shards capable of verifying the transaction, so as to buffer the transaction in buffers corresponding to different shards on the LL. When transaction information in buffer is sufficient, the LL sends the transaction information to corresponding shards for verification.

The system stores the VRF random number sequences generated by all encoding shards in each round. Based on the VRF random number sequences generated in this round, after any node knows the height of the block in which the transaction is stored, it can divide the height of the block by the number of shards to obtain the round number in which the block is generated and the number of an original shard storing the block, and the LL buffers the transaction information into the LL buffers corresponding to different shards.

The transaction information verification module is used to determine legitimacy of the transaction based on the transaction information stored in the node.

When the system adopts the UTXO transaction model, the transaction information verification module of each server inquires, through the storage module, whether the UTXO consumed by this transaction is available and whether the face value of the UTXO is sufficient to pay for the transaction. When the system adopts the account-balance transaction model, based on the transaction information in the storage module, whether the shard knows account information of an expenditure account is inquired, and then whether the account balance is sufficient to pay the transaction is verified.

The intra-shard consensus module is used to reach a consensus on a verification result among nodes in the shard, and the leader node in the shard returns the verification result to the LL.

The nodes in the shard can communicate with each other, and the intra-shard consensus module can support various intra-shard consensus schemes, including but not limited to Proof of Work (POW), Proof of Stake (POS), PBFT, and so on. The default intra-shard consensus scheme is the PBFT consensus scheme.

The node identity module is used for node identity determining and signing, to ensure that all messages sent by the server in the system are signed, and sources of the messages are verified through signatures.

The signature aggregation module is used to aggregate signatures, when the leader node in each shard requires nodes in the shard to reach a consensus on a same message and send a consensus result to other shards, signatures of a sufficient quantity of nodes in the shard that support the message. The whole aggregation process is irreversible, information before aggregation cannot be obtained through the aggregated public key and signature, and the aggregated signature only needs to be verified once. The aggregated signature greatly reduces the cost of communication and verification while maintaining the information reliability.

The counting and block generation and distribution module is used to make statistics on transaction verification information returned by each shard. When more than half of the shards participating in the verification consider a transaction as legitimate, the transaction is verified as legitimate. When LL verifies a specific quantity of transactions as legitimate, it divides the transactions into k pieces, packages them into k blocks, and distributes them to k original shards.

The encoding module is used to generate an encoding block. In each round of consensus, after verifying a plurality of transactions based on historical blocks, the LL divides legitimate transactions into k parts, packages the k parts into k blocks, and sends the k blocks to k original shards. Each encoding shard generates a random number based on the VRF algorithm, and encodes, based on the random number, a block stored in this round of consensus by an original shard participating in generation of the encoding shard, to obtain an encoding block to be stored by the encoding block in this round of consensus.

The storage module is used to store blockchain data to be stored by the shard to which the node belongs. The storage module is built based on an existing database, and is divided into a blockchain storage module, a transaction information storage module, and a blockchain information storage module, respectively storing blocks or encoding blocks corresponding to the shard, latest UTXO state information or account balance information related to the block, and historical information of the VRF algorithm or historical information of other shards. The blocks stored in the transaction information storage module are related to a transaction model adopted by the system. When the system adopts the UTXO transaction model, the block stored by the transaction information storage module of the encoding shard is UTXO status information of all original blocks associated with the encoding block stored in the node. When the system adopts the account-balance model, the block stored in the transaction information storage module of a node is a latest state of an account involved in the blocks stored in the node. When the information of an account stored by the shard to which the node belongs is no longer the latest state, the account information is deleted, and a shard to which a node storing the latest state information of the account belongs is responsible for storing the latest balance state of the account.

Embodiment 2

Figure 2:
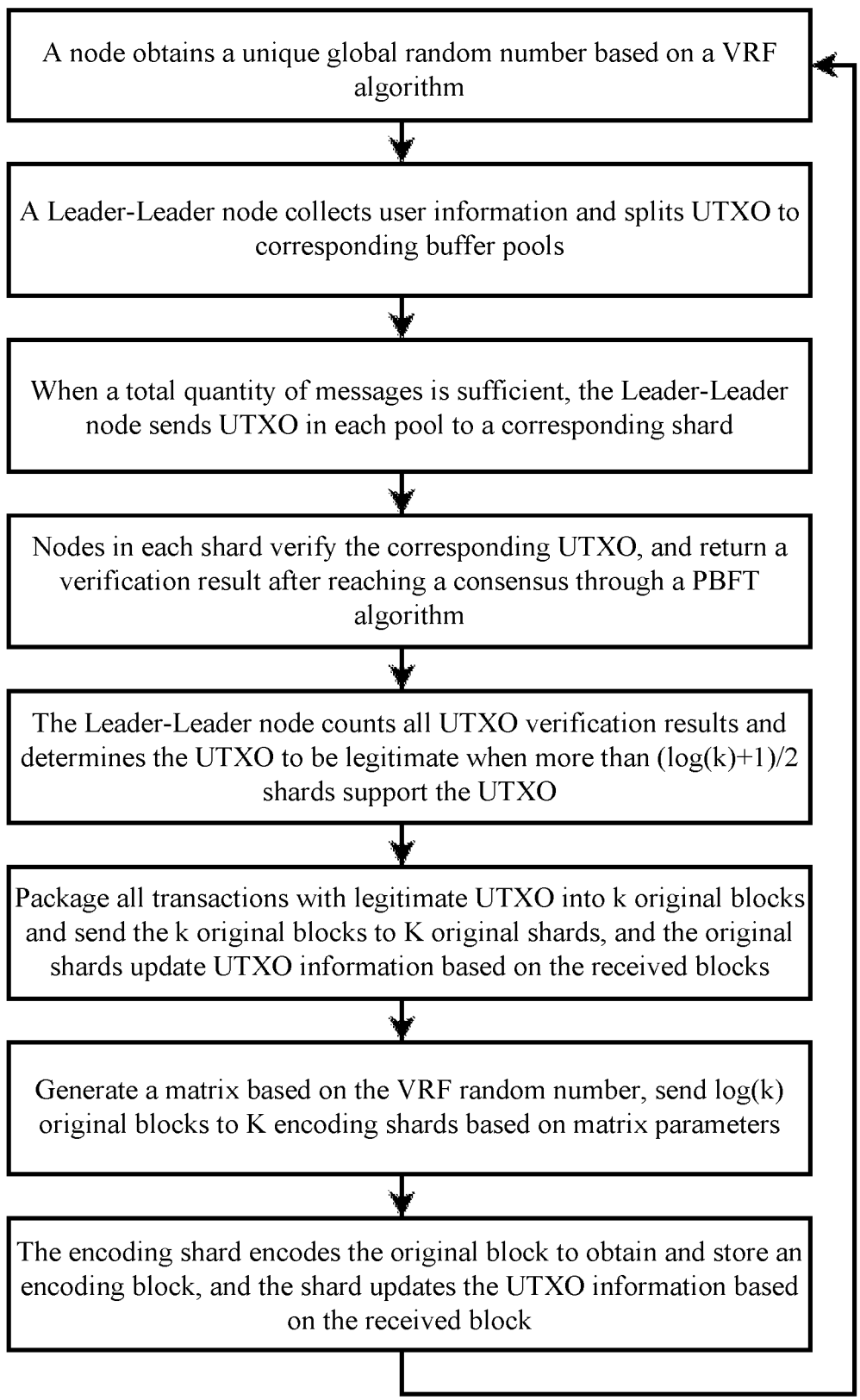
FIG. 2 is a flowchart of a blockchain sharding method based on locally repairable system codes according to an embodiment of the present disclosure.

The present disclosure provides a distributed consensus method based on system codes. The method includes a VRF random number generation and distribution phase, a transaction allocation phase, an intra-shard consensus phase, an inter-shard voting phase, a block generation phase, a block encoding phase, and a transaction information storage phase. As shown in FIG. 2, the method includes the following steps:
  (1) At the beginning of each round of consensus, each encoding shard generates a VRF random number, signatures and broadcasts the VRF random number to all other shards. Any shard is capable of associating the encoding shard with original shards based on random number sequences of all the encoding shards in this round.
  (2) The LL collects to-be-verified transaction information, and stores, based on a historical VRF random number sequence, the to-be-verified transaction information in message buffers corresponding to different shards on the LL. When a total amount of to-be-verified transaction information in the buffers reaches the threshold, the to-be-verified transaction information in the corresponding buffer is sent to each shard.
  The transaction includes four parts: a transaction head, a historical transaction used as a support and a height of a block in which the transaction is stored, and other information such as a signature of a transaction user of a newly generated transaction that is used as an output. Based on the historical transaction and information about the height of the block in which the historical transaction is stored, combined with the historical VRF random number sequence, the LL determines an original shard and a plurality of corresponding encoding shards that are capable of verifying the transaction. When the system adopts the UTXO model, the historical transaction refers to a generated transaction of the UTXO as the input. When the system adopts the account-balance model, the historical transaction refers to the last transaction of the user.
  (3) A leader node in each shard leads nodes in the shard to verify the to-be-verified transaction, to reach a consensus on a verification result by using a PBFT consensus algorithm; and the leader node in each shard aggregates signatures of the nodes in the shard on the result, and returns the consensus result and the aggregated signatures to the LL.
  (4) The LL makes statistics on the consensus results of the shards, and when a quantity of shards verifying the to-be-verified transaction to be legitimate exceeds a threshold, the system determines the transaction as a legitimate transaction. When no shard in the system is corrupted, any legitimate transaction is verified as legitimate. When a single shard in the system is corrupted, other shards in the verification group are still capable of verifying a legitimate transaction as legitimate, and the system is still secure and available.
  (5) After the system accumulates suffice valid transactions, the LL divides the valid transactions into k parts, that is, packages the valid transactions into k blocks, and sends the k blocks to the original shards with corresponding numbers. Each original shard distributes, based on the VRF random number sequences generated in this round, the received blocks to the corresponding encoding shards with the original shard.
  (6) Each encoding shard generates, based on the blocks received in this round, an encoding block of the shard in this round of consensus.
  (7) The original shard stores the corresponding block and transaction information in the block; the encoding shard stores corresponding UTXO information in the blocks received from the original shard, and stores the encoding block, and then deletes the received blocks.

Embodiment 3

Figure 3:
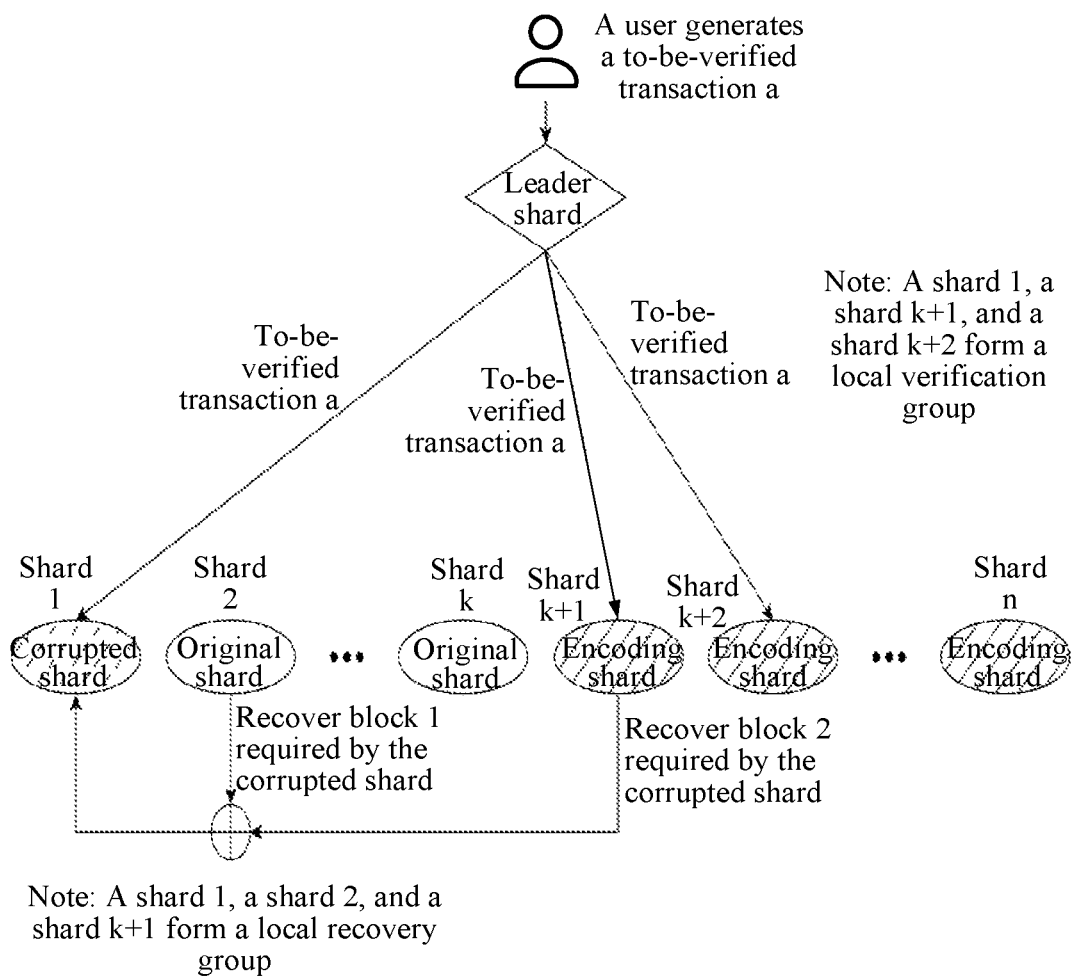
FIG. 3 is a schematic structural diagram of a blockchain sharding system based on locally repairable system codes according to an embodiment of the present disclosure.

The present disclosure provides a blockchain system based on system codes. As shown in FIG. 3, in the system, a plurality of servers used as blockchain nodes are divided into n groups, each group represents one shard, the system includes n shards, the n shards include original shards and n–k encoding shards, block data stored in each encoding shard is generated through linear combination of block data stored in a plurality of original shards, and all the shards achieve intra-shard consensus through a same BFT algorithm. Further, one of the n shards is selected as the leader shard, the leader node in the leader shard is denoted as LL, and the LL is not only responsible for consensus within the leader shard, but also participates in the consensus process of the whole blockchain sharding system. All nodes in the same shard store the same block information, and nodes in different shards store different block information. No node stores all the blocks, but all nodes need to store a coding matrix generated with the VRF random numbers.

The specific embodiment of the present disclosure are described above to make those skilled in the art understand the present disclosure, but it should be clear that the present disclosure is not limited to the scope of the specific embodiment. For those of ordinary skill in the art, as long as various changes fall within the spirit and scope of the present disclosure defined and determined by the appended claims, these changes are apparent, and all inventions and creations using the concept of the present disclosure shall fall in the protection scope of the present disclosure.

What is claimed is:
1. A blockchain sharding method, comprising:
  at beginning of each round of consensus, generating, by each encoding shard, a verifiable random function (VRF) random number, signing and broadcasting the VRF random number to all other shards, wherein any shard is used for associating the encoding shard with original shards based on random number sequences of all the encoding shards in the round;
  collecting, by a leader shard (LL), to-be-verified transaction information, and storing, based on a historical VRF random number sequence, the to-be-verified transaction information in message buffers corresponding to different shards on the LL; and when a total amount of the to-be-verified transaction information in the message buffers reaches a threshold, sending the to-be-verified transaction information in the corresponding buffer to each shard;
  leading, by a leader node in each shard, nodes in the shard to verify the to-be-verified transaction, to reach a consensus on a verification result by using a Practical Byzantine Fault Tolerance (PBFT) consensus algorithm; and aggregating, by the leader node in each shard, signatures of the nodes in the shard on the verification result, and returning the consensus result and the aggregated signatures to the LL;

making, by the LL, statistics on the consensus results of the shards, and when a quantity of shards verifying the to-be-verified transaction to be legitimate exceeds the threshold, determining, by a blockchain, the transaction as a legitimate transaction, and wherein when no shard in the blockchain is corrupted, any legitimate transaction is verified as legitimate; or when a single shard in the blockchain is corrupted, other shards in a verification group are still capable of verifying a legitimate transaction as legitimate, and the blockchain is still secure and available;

after the blockchain accumulates sufficient valid transactions, packaging, by the LL, the valid transactions into k blocks, and sending the k blocks to the original shards with corresponding numbers; and distributing, by each original shard based on the VRF random number sequences generated in the round, the received blocks to the corresponding encoding shards with the original shard;

generating, by each encoding shard based on the received blocks in the round, an encoding block of the shard in the round of consensus; and storing, by the original shard, the corresponding block and transaction information in the block; storing, by the encoding shard, corresponding unspent transaction outputs (UTXO) information in blocks received from the original shard, and storing the encoding block, and then deleting the received blocks.

2. The blockchain sharding method according to claim 1, wherein the to-be-verified transaction information received in the collecting step comprises: a transaction head, a historical transaction used as a support and a height of a block in which the historical transaction is stored, and other information such as a signature of a transaction user of a newly generated transaction k that is used as an output; and wherein based on the historical transaction and information about the height of the block in which the historical transaction is stored, combined with the historical VRF random number sequence, the LL determines an original shard and a plurality of corresponding encoding shards that are capable of verifying the transaction.

* * * * *